United States Patent
Davis, Jr. et al.

(10) Patent No.: US 9,237,128 B2
(45) Date of Patent: Jan. 12, 2016

(54) FIREWALL PACKET FILTERING

(71) Applicant: International Business Machines Corporation, Armonk, NY (US)

(72) Inventors: Donald T. Davis, Jr., Somerville, MA (US); Michael T. Evans, Oakbrook Terrace, IL (US)

(73) Assignee: International Business Machines Corporation, Armonk, NY (US)

(*) Notice: Subject to any disclaimer, the term of this patent is extended or adjusted under 35 U.S.C. 154(b) by 89 days.

(21) Appl. No.: 13/839,266

(22) Filed: Mar. 15, 2013

(65) Prior Publication Data

US 2014/0282830 A1 Sep. 18, 2014

(51) Int. Cl.
*H04L 29/06* (2006.01)

(52) U.S. Cl.
CPC ................................ *H04L 63/0227* (2013.01)

(58) Field of Classification Search
CPC ... H04L 63/02; H04L 63/0218; H04L 63/029; H04L 63/0227; H04L 63/0263; H04L 29/06
See application file for complete search history.

(56) References Cited

U.S. PATENT DOCUMENTS

| | | | |
|---|---|---|---|
| 5,708,659 A * | 1/1998 | Rostoker et al. | 370/392 |
| 6,212,184 B1 | 4/2001 | Venkatachary et al. | |
| 6,292,795 B1 | 9/2001 | Peters et al. | |
| 6,751,627 B2 | 6/2004 | Sternin | |
| 7,394,809 B2 * | 7/2008 | Kumar et al. | 370/392 |
| 7,523,218 B1 | 4/2009 | Sahni et al. | |
| 7,702,630 B2 | 4/2010 | Basso et al. | |

OTHER PUBLICATIONS

Deri, Luca, "High-Speed Dynamic Packet Filtering", Journal of Network and Systems Management, vol. 15, Issue 3, http://luca.ntop.org/Blooms.pdf, Sep. 2007, pp. 1-14.
Geraci, Filippo et al., "Packet Classification via Improved Space Decomposition Techniques", IEEE, http://cial.csie.ncku.edu.tw/presentation/group_pdf/ATT00052.pdf, 2005, pp. 304-312.

* cited by examiner

*Primary Examiner* — Chau Le
*Assistant Examiner* — Muhammad Chaudhry
(74) *Attorney, Agent, or Firm* — Stephen R. Tkacs; Stephen J. Walder, Jr.; William J. Stock

(57) ABSTRACT

Mechanisms are provided for performing an operation on a received data packet. A data packet is received and a hash operation on a header field value of a header of the data packet is performed to generate a hash value. A lookup operation is performed in a hash table associated with a type of the header field value to identify a hash table entry. A bit string associated with the hash table entry is retrieved, where each bit in the bit string corresponds to a class of rules of a rule set of a firewall. A matching operation of the header field value to rules in classes of rules corresponding to bits set in the bit string is performed to select one or more search trees. Operations are performed based on rules in the classes of rules being matched by header field value of the data packet.

16 Claims, 3 Drawing Sheets

FIREWALL PACKET FILTERING

BACKGROUND

The present application relates generally to an improved data processing apparatus and method and more specifically to mechanisms for improving the performance of firewall packet filtering.

Packet classification is a function performed by modern Internet routers whose aim it is to classify packets into "classes" or "flows" according to an established rule set that looks at multiple fields of each packet. Once this classification is performed, different actions can be performed on the data packets depending on the results of the classification. One example of an algorithm that may be implemented by routers to perform such classification is the G-filter algorithm.

The "G-filter" algorithm is a packet filtering algorithm that supports fast matching of packet 5-tuples to a listing of firewall rules n-tuples (where n is less than or equal to 5). In the G-filter algorithm, each packet header has two addresses, two ports, and a transport protocol. Each firewall rule specifies ranges of values for one or more of these 5 fields. Thus, in the 5-tuple version of G-filter, each rule falls into one of 32 classes, depending on which tuple fields the rule matches. G-filter calls these classes "fallback sets."

For example, if two rules both regulate packets only by the packets' destination addresses and destination ports, the G-filter indicates that these two rules are in the same fallback set. If another rule regulates packets by destination address, destination port, and transport protocol, then G-filter indicates that this rule is in a different fallback set. It is convenient to label each fallback set of rules with a 5-bit string, in which each 1 bit identifies a tuple-dimension that all of the set's rules are associated with or care about:

$0^{th}$ bit: rules that match packets by source-address.
$1^{st}$ bit: rules that match packets by destination-address.
$2^{nd}$ bit: rules that match packets by source-port.
$3^{rd}$ bit: rules that match packets by destination-port.
$4^{th}$ bit: rules that match packets by transport-protocol.

G-filter builds a separate search-tree for each fallback set in a rule set. At packet matching time, G-filter searches every fallback set's search tree. More information about the G-filter algorithm may be found in Geraci et al., "Packet Classification via Improved Space Decomposition Techniques," IEEE 2005.

SUMMARY

In one illustrative embodiment, a method, in a data processing system, is provided for performing an operation on a received data packet. The method comprises receiving a data packet and performing a hash operation on a header field value of a header of the data packet to generate a hash value. The method further comprises performing a lookup operation in a hash table associated with a type of the at least one header field value based on the hash value to identify a hash table entry. Moreover, the method comprises retrieving a bit string associated with the hash table entry, where each bit in the bit string corresponds to a class of rules of a rule set of a firewall. In addition, the method comprises performing a matching operation of the header field value to rules in one or more classes of rules corresponding to bits set in the bit string. Furthermore, the method comprises performing an operation based on zero or more rules in the one or more classes of rules being matched by the header field value of the data packet.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
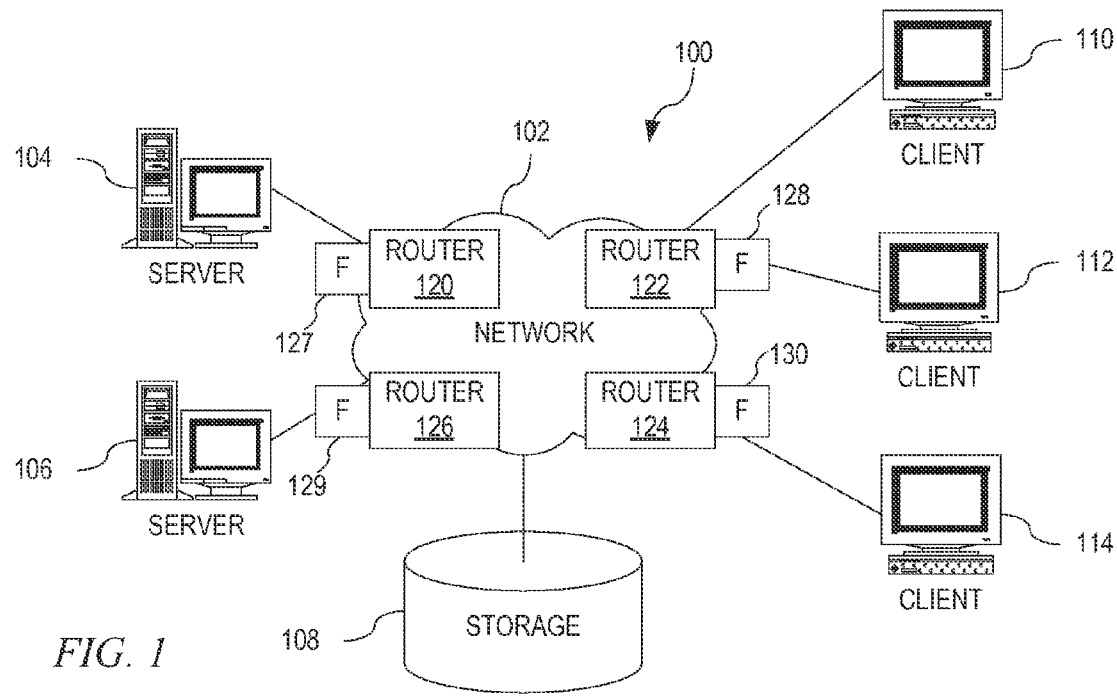
FIG. 1 is an example diagram of a distributed data processing system in which aspects of the illustrative embodiments may be implemented.

As mentioned above, one of the algorithms that may be used to perform classification of data packets in routers is the G-filter algorithm which matches packet 5-tuples to firewall n-tuples. As recognized by the present inventors, with G-filter, for a typical 5-tuple rule set, most rules fall into a few fallback sets, such as:

0x0a: destination address and destination port.
0x1a: destination address, destination port, and transport protocol.
0x1b: source address, destination address, destination port, and transport protocol.

where the hexadecimal value is a fallback set identifier that uniquely identifies the fallback set within the rule set.

However, the typical rule set will also have a variety of small fallback sets, such as:

0x01: source address only.
0x02: destination address only.
0x03: source address and destination address.
0x18: destination port and transport protocol.
0x12: destination address and transport protocol.

In a fairly typical real-world rule set containing 90 5-tuple rules, rules are partitioned into 9 fallback sets, with 70 rules falling into three large fallback sets and 20 rules falling into six smaller fallback sets, where large fallback sets are those that have a relatively greater number of rules and smaller fallback sets have a relatively smaller number of rules. Even though most packet traffic matches only the rules in the 3 largest fallback sets, G-filter must match every packet against all 9 fallback sets' search trees. Further, the search time increases disproportionately for the small fallback sets because each tree's search time increases only as the logarithm of the fallback set's size.

The G-filter algorithm works on data packet 5-tuples, e.g., source address, source port, destination address, destination port, and transport protocol. However, it is possible to extend the G-filter algorithm to larger size tuples, e.g., 7-tuples, where more fields of a data packet are considered when performing the classification of data packets and matching of data packets to rule sets. For example, in addition to the source/destination addresses/ports, and the transport protocol, rule sets may be established for cases where the VLAN-ids and adapter numbers are important as well as these addresses/ports and protocol.

However, when extending a firewall's rule syntax and the use of the G-filter to larger size data packet tuples, a large number of small fallback sets are created with only a relatively few additional large fallback sets being created. For example, with a 7-tuple rule set implementation, the rules may fall into 128 potential fallback sets, most of which will be small fallback sets. Hence, a 7-tuple version of the G-filter algorithm must spend a much larger proportion of its search time in traversing many small search trees whose rules only rarely match data packets in the traffic seen by the firewall.

The illustrative embodiments provide mechanisms for increasing the performance of a firewall filter, such as a G-filter algorithm as one example, at runtime by using a hashing technique to determine which of the rule sets, e.g., fallback sets, to search using their corresponding search trees. For purposes of this description, it will be assumed that the firewall implements a G-filter algorithm, however the invention is not limited to such and may be used with any firewall filter that performs searches of rules to determine which rules apply to a data packet for filtering purposes.

With a G-filter implementation as an example, the illustrative embodiments, at search tree building time, build hash tables from the rule set using the middle bits of commonly used fields in each rule. The hash values of the hash tables map a single range of addresses or ports to a single hash value. Fields of an incoming data packet are used to generate a plurality of hash values that are used to perform hash lookup operations in corresponding hash tables to identify lists of fallback sets of rules corresponding to the hash values. The intersection of the lists of fallback sets of rules yields a minimized set of search trees that are to be traversed when performing the G-filter rule matching operations. Thus, the illustrative embodiments allow the G-filter algorithm to be extended to any number n tuples, i.e. any n-tuple, without negatively impacting performance by providing a mechanism for minimizing the search trees traversed by the G-filter algorithm for any size of n-tuple.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
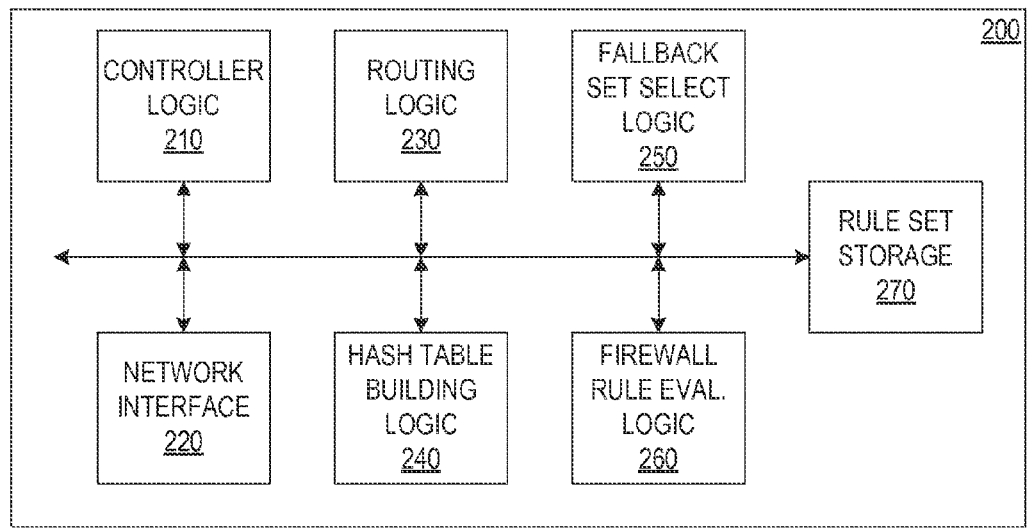
FIG. 2 is an example diagram illustrating a block diagram of a firewall mechanism in accordance with one illustrative embodiment.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like.

In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

The network 102 comprises a plurality of routers 120-126 for routing data packets from a source device to a destination device, where the source and destination devices may be any of the computing devices, e.g., servers 104 and 106, storage device 108, client computing devices 110-114, or the like. In performing these routing operations, one or more of the routers 120-126 may be associated with a firewall 127-130 either in hardware, software, or a combination of hardware and software, either in the same or a different device as the routers 120-126. For illustrative purposes only, FIG. 1 shows each router 120-126 being associated with a separate firewall 127-130, however the invention is not limited to such. Rather, a single firewall 127 may be associated with a plurality of routers 120-126 and other computing devices without departing from the spirit and scope of the illustrative embodiments. Moreover, multiple different firewalls may be associated with a single router. As such, there may not be a one-to-one correspondence between firewalls and routers as depicted but any configuration of firewalls and routers is intended to be within the spirit and scope of the illustrative embodiments.

In some illustrative embodiments, the firewall 127-130 operates as a gateway between networks, e.g., between LANs, between a LAN and a WAN, or between an organization's WAN and the Internet. The firewall 127-130 compares the characteristics of the data packets received by the router 120-126 for routing to a destination computing device with one or more firewall rules to determine actions to be performed on the data packets, if any, before routing the data packets onto the next destination along the path to the destination computing device, or to the destination computing device itself. In accordance with the illustrative embodiments of the present invention, the firewalls 127-130 utilize an augmented filter logic, such as an augmented G-filter logic, in accordance with one or more of the illustrative embodiments, to perform the search of the rule sets to determine which rules are applicable to the received data packets. The data packets may then be evaluated against the conditions and criteria set forth in the rule sets to determine which, if any, rules apply to the particular data packets and what corresponding actions to perform based on the data packet characteristics matching conditions/criteria of the rules.

In accordance with the illustrative embodiments, a firewall, such as firewall 127, implements the augmented filter logic of the illustrative embodiments, which in one illustrative embodiment may be an augmented G-filter logic. The filter logic of the illustrative embodiments make use of a plurality of hash tables for each of a plurality of characteristics of a data packet upon which rules of rule sets may be based. These hash tables comprise cells which are indexed by corresponding hash values. For purposes of the following description of the illustrative embodiments, it will be assumed that the filter logic being employed by the firewall is an augmented form of the G-filter logic that implements the hash table based mechanism of the illustrative embodiments for determining which fallback sets' search trees to search when performing rule matching operations.

The cell of a hash table entry comprises an integer value represented as a bit-string, e.g., a 16-bit string. For example, if a rule set may be partitioned into 10 classes, or fallback sets, then each subset of fallback sets, i.e. each collection of fallback sets, of this 10 element group of fallback sets is represented by a corresponding 16-bit string in a hash table entry.

In one illustrative embodiment, there are separate hash tables generated for each of a plurality of data packet header and rule characteristics. Thus, for example, data packets may include, in their header, a source address, destination address, and destination port number. These same three fields may be used to define a rule in a rule set of a firewall, thereby constituting characteristics of the rule. For each of these fields/characteristics, a separate hash table may be generated. Thus, there may be a first hash table for source address, a second hash table for destination address, and a third hash table for destination port number. Each of these hash tables, in one illustrative embodiment, may have 256 cells so as to be indexed with a one-byte hash value.

The hash functions for each of these hash tables may be based on the particular protocol used and the field/characteristic that is the basis for the hash table. For example, with the Internet Protocol version 4 (IPv4) addresses, the hash function may take the IPv4 address' bytes 2 and 3, i.e. the most-significant two bytes of the address, as input. This is done because the two least significant bytes tend to vary significantly and thus are not as useful for hashing purposes. For IPv6 addresses, the hash function may take bytes 8-10 as input, for example. This is because, for addresses, the hash function uses the least significant bits that identify a subnet. This selection of bytes is based on an observation of normal network-operations practice. For example, it is common for many companies to build a wide area network out of several class-B networks, in each of which all of the IP addresses have the same two most significant bytes, such as "192.168.xxx.xxx." For IPv6 addresses, the appropriate bytes for hashing would be in the middle of the address because of the particular way in which IPv6 network allocations are done. In essence, the hashing is done on the most variable bits that a network administrator explicitly uses in their firewall rules.

For port numbers, the hash function may make use of middle bits, e.g., the middle 8-bits, of the port number. This is so that the hash value identifies a typical range of port numbers used with rules in a rule set. Whether based on addresses or port numbers, the hash function maps a single range of addresses/port numbers to a single hash value.

When building hash tables, the illustrative embodiments converts a rule's fallback set identifier, e.g., a 7-bit string, to a bit-index that identifies a bit within a cell that corresponds to the fallback set identifier. This conversion may be performed using a lookup table or other data structure that maps the fallback set identifier to a bit-index. In fact, in some illustrative embodiments, two lookup table data structures are utilized, one that maps the fallback set identifier to the bit-index and another that maps the bit-index to the fallback set identifier so that either value can be identified from the other value. The lookup table data structure(s) in one illustrative embodiment, may be created by taking the full set of fallback sets actually present in a rule set and sort them according to their fallback set identifier number (the hexadecimal numbers uniquely identifying the particular fallback set). Each fallback set's position in the resulting listing of fallback sets is its fallback set bit-index. Thus, one or two lookup table data structures corresponding to this listing of fallback sets with their position in the listing being their bit-index may be generated and used.

For example, in the example ruleset mentioned above, the fallback sets are 0x01, 0x02, 0x03, 0409, 0x12, 0x13, and 0x18 (with the fallback sets numbered 0 to 6). If the fifth fallback set has as its active fields/characteristics, the source address, destination address, and transport protocol, then in this example, the fallback set identifier is 19 (0x13). However, with the illustrative embodiments, this rule's fallback set is mapped to a bit position in a bit-index of a hash table. Thus, for example, if a cell of a hash table entry is a 16-bit string, then the rule's fallback set is mapped to bit position "X," where "X" is 5 in this particular example, i.e. in the example above, fallback set 0x01 is the "zeroth" fallback set and thus, fallback set 0x18 is the fifth fallback set in the listing above.

Each field corresponding to the fallback set identifier is checked to determine if the number of addresses or ports within the field's ranges is equal to or less than the size of the hash table, i.e. a number of hash table entries supported by the hash table. For example, for a rule, the rule's source addresses are counted and checked to determine if the number of addresses is equal to or less than 256, where 256 in this example is the maximum size of the hash table. Similarly, the rule's destination addresses and destination ports are counted and checked.

As an example, consider that a rule's fallback set is mapped to bit position "X" in each hash table cell and thus, adding a rule to the hash-tables will cause the Xth bit in zero, one, or several hash-table cells to be set to the Boolean value "1" instead of "0." The number of Xth bits changed in the hash tables when the rule is added depends on the sizes of the rule's address ranges and port ranges. For example, if the rule's IPv4 source address field specifies a range of 100 addresses that vary only in the least-significant byte, then in all 100 address, the two most-significant bytes are the same and have the same hash-value. Hence, in the source address hash-table, only the one hash value's cell's Xth bit will be set to the value "1." If instead, the rule's address range specifies 100 addresses that vary only in the upper-middle byte (e.g., addresses 10.1.0.0 to 10.100.0.0), then these addresses will have 100 or nearly 100 different hash values. Hence the corresponding 100 cells' Xth bits will be set to the value "1". Still further, if instead the address range specifies 256 addresses that vary only in the upper middle byte (e.g., 10.0.0.0 to 10.255.0.0), then in the source address hash table, every cell's Xth bit will be set to the value "1."

For fewer than 256 addresses or ports in the fallback set, each elements' hash value is calculated based on the particular field/characteristic of the hash table, e.g., source address, destination address, destination port, or the like. Thus, for example, for each rule in the fallback set, a hash value "Y" is calculated based on the field/characteristic of the hash table. In hash table entry "Y", the Xth bit is set, where X again is the bit position corresponding to the rule's fallback set identifier.

Thus, each hash table entry in a hash table, has a corresponding cell having a bit string, such as a 16-bit string, with each bit corresponding to a different fallback set identifier. Hence, the entries in a hash table identify which fallback sets have rules that reference the field/characteristic that is the basis for that hash table. It should be appreciated that while a 16-bit string is mentioned in the examples above, the actual bit string may be of any of a plethora of different sizes depending on the particular implementation, e.g., 32, 64, 128, or the like, as needed.

For example, for a hash table whose hash function is performed on a source address of a data packet, a rule that makes reference to a source address as a basis for matching a data packet to the rule is identified and its corresponding fallback set identifier is converted to a bit index. If the range of source addresses in this fallback set is equal to or less than the size of the hash table, then each rule's hash value for its source address is calculated and a corresponding hash table entry in the hash table is selected. A bit in the bit string of the cell of the hash table entry, corresponding to the bit index of the rule's fallback set identifier, is then set to indicate that there is a rule in the fallback set that makes reference to the source address corresponding to the hash table entry.

If the range of elements, e.g., source addresses, destination address, port numbers, or the like, is greater than the size of the hash table, e.g., greater than 256, then rather than setting the Xth bit of a particular one of the hash table entries corresponding to the hash of the element, e.g., source address, the Xth bit of every hash table entry is set. Setting the Xth bit in all of the cells of the hash table entries is an approximation, since it will cause the search tree for the fallback set to be searched for every one of the source addresses. However, the approximation will be accurate enough as long as the hash function is nearly 1-to-1, e.g., the hash value comes from just one source address. This approximation is always faster than calculating hundreds of hashes.

The above set of operations may be performed for each address in an address range of a rule and for each destination port in a destination port range of a rule. Thus, the same rule set's bit index may be set in a plurality of the hash tables, e.g., one or more of hash tables for the source address, the destination address, and destination port. This hash table building operation may be performed during a search tree building phase of the augmented filter logic implemented by the firewall of the router. This may be part of an initial stage in which the firewall mechanisms are initiated using the existing defined rule set and its defined fallback sets specified using the G-filter algorithm. Moreover the hash table building operation may be performed when the rule set is modified, e.g., when new rules are added to the rule set, existing rules are modified, rules are deleted from the rule set, new fallback sets are defined, or the like.

With the hash tables defined for the various data packet fields/characteristics of the rules in the rule set of the firewall, data packets may be processed via the firewall rules using the augmented filter mechanisms of the illustrative embodiments to match the incoming data packets to corresponding fallback sets in the rule set of the firewall. In one illustrative embodiment, for each incoming data packet, the following operations are performed. From the data packet's two addresses, e.g., source and destination addresses, and its port number, e.g., destination port number, the hash values $Y\_sa$, $Y\_da$, and $Y\_dp$ are calculated using corresponding hash functions, where $Y\_sa$ is the hash value for the source address (sa), $Y\_da$ is the hash value for the destination address (da), and $Y\_dp$ is the hash value for the destination port (dp).

A lookup operation is performed in the hash tables to find cells corresponding to the hash values $Y\_sa$, $Y\_da$, and $Y\_dp$. For example, cell values $C\_sa$, $C\_da$, and $C\_dp$ are calculated as a function of the hash values, e.g., $C\_sa=H\_sa[Y\_sa]$, $C\_da=H\_da[Y\_da]$, and $C\_dp=H\_dp[Y\_dp]$, where $H\_sa$, $H\_da$, and $H\_dp$ are the same hash functions used to build the hash tables. The three bit strings corresponding to the cells $C\_sa$, $C\_da$, and $C\_dp$ represent three lists of fallback sets of rules that mention somewhere the same source address as data packet P, the same destination address as data packet P, and/or the same destination port number as data packet P.

The set $F\_p$ represents the intersection of this list of fallback sets specified in the cells $C\_sa$, $C\_da$, and $C\_dp$. Thus, $F\_p=C\_sa$ AND $C\_da$ AND $C\_dp$ and each element of this resulting list $F\_p$ represents fallback sets that mentions somewhere the same source address, destination address, and/or destination port as data packet P. The list $F\_p$ may not, however, necessarily have a single rule that mentions all three elements, i.e. source address, destination address, and destination port number. For example, if $C\_sa$ is the bit string [0000010000000010], $C\_da$ is the bit string [0001001010100010], and $C\_dp$ is the bit string [1000000000000010], then the list $F\_p$ is represented by the bit string [0000000000000010]. Said using hexadecimal notation, if $C\_sa$ is the bit string 0x0402, $C\_da$ is the bit string 0x12a2, and $C\_dp$ is the bit string 0x8002, then the list $F\_p$ is represented by the bit string 0x0002.

The list $F\_p$ is converted to a list $L\_p$ of fallback set identifiers by correlating the set bits, e.g., bits having a logic "1" value, in the list $F\_p$ with fallback set identifiers using a lookup table for example that maps the bit number to a fallback set identifier. This represents the list of fallback sets whose search trees are to be searched to perform a match of the data packet to one or more rules of the firewall. For example, using the list $F\_p$ bit string [1001001010100010], this list $F\_p$ may be converted to a listing $L\_p$ comprising fallback set identifiers 1, 5, 7, 9, 12, and 15. The fields of the data packet P, i.e. the source address, destination address, and port number of the data packet P, are compared against the corresponding characteristics specified in the conditions/criteria of the rules in the fallback sets of the list $L\_p$. This may involve using the G-filter algorithm, for example, to perform the matching of the data packet P to rules of the firewall.

As long as each cell's bit string is sparsely populated with set bits, the three-way intersection of the cells $C\_sa$, $C\_da$, and $C\_dp$ will yield only one or two fallback set identifiers, and their corresponding search trees, that must be traversed at matching time when matching the data packet P to rules of the rule set.

With the mechanisms of the illustrative embodiments, the building of the hash tables does not significantly prolong the tree-building phase of the augmented filter algorithm. The hash tables themselves are very compact and do not significantly increase the augmented filter's memory footprint. The hash table mechanisms do not burden the firewall operation with additional complexity. It has been determined that even with a 5-tuple G-filter implementation, the mechanisms of the illustrative embodiment doubled the speed of the filter's matching operation. For a 7-tuple or more G-filter implementation, the performance improvement over standard G-filter implementations is believed to be even greater.

Thus, the illustrative embodiments provide mechanisms for identifying a subset of the total number of fallback sets that should be searched for purposes of matching a data packet to rules of a firewall. The illustrative embodiments use hash tables and hash functions directed to the most typically used port numbers and the address' least significant bits that identify subnets. The hash tables themselves are for a subset of fields/characteristics of the n-tuple that are most often utilized in rules of the rule set, e.g., source address, destination address, and destination port. These three fields/characteristics are likely to identify the rule sets pertinent to the matching of the data packet P.

The hashing technique of the illustrative embodiments combines the following features to obtain good performance. The hash functions use only certain moderately-variable bits from each packet-header field. Each hash table cell is not a collision list but a bit-string representing the rule set's collection of fallback sets. The hash tables' cell size is variable, and is chosen at tree building time to accommodate the number of fallback sets that actually occur in the customer's rule set. A binary AND logic operation is used to compute the set-intersection of the three field/characteristics' collections of fallback sets. A fast binary bitwise search of the three hashes' AND'ed bitstring is utilized to build the list of bit string indices indicating fallback sets whose search trees must be traversed. A lookup table may be used to map each bit string bit index to the corresponding fallback set.

FIG. 2 is an example diagram illustrating a block diagram of a firewall mechanism in accordance with one illustrative embodiment. The elements shown in FIG. 2 may be implemented as hardware, software, or any combination of hardware and software. In one illustrative embodiment, the elements shown in FIG. 2 are implemented as software instructions loaded into one or more memories and executed by one or more processors of a computing device. In one illustrative embodiment, this firewall mechanism is implemented in, or in conjunction with, one or more routers. The routers may implement a software and/or hardware firewall or the firewall may be implemented in a separate computing device but work with such routers to filter and route data packets to/from computing devices in one or more networks. For ease of explanation herein, it will be assumed that the firewall mechanism 200 is an integrated firewall/router mechanism, however it should be appreciated that various ones of the elements shown in FIG. 2 may be implemented in separate data processing devices without departing from the spirit and scope of the illustrative embodiments. That is, while the illustrative embodiments will be described as being directed to a router implementing a firewall, it should be appreciated that the present invention is not limited to such. Rather, the mechanisms of the illustrative embodiments may be integrated into an endpoint computing device, such as a client computing device, server computing device, or the like, instead of being in a separate router device. Moreover, the firewall mechanisms may be integrated with other hardware/software mechanisms for performing other operations on data traffic, such as load balancing, redirection, and the like.

As shown in FIG. 2, the firewall mechanism 200 includes control logic 210, network interface 220, routing logic 230, hash table building logic 240, fallback set selection logic 250, firewall rule evaluation logic 260, and rule set storage 270. The control logic 210 provides logic in hardware, software, or both hardware and software, for controlling the overall operation of the firewall mechanism 200 and orchestrating the operation of the other elements 210-270. The network interface 220 provides a data communication pathway through which data packets are received by the router and transmitted by the router over one or more data networks. The routing logic 230 comprises hardware/software logic for performing routing operations for data packets as is generally known in the art and thus, not further described in detail herein.

The hash table building logic 240 comprises hardware/software logic that is responsible for building the hash tables for use by the fallback set selection logic 250 when the fallback set selection logic 250 selects fallback sets whose search trees are to be searched by the firewall rule evaluation logic 260. The hash table building logic 240 may implement the functionality previously described with regard to hash table building in which, for each address range in a rule, and each destination port range in a rule (taking source address, destination address, and destination port as examples of the fields/characteristics used by this example implementation of the illustrative embodiments), the rules fallback set identifier is converted to a bit index, the range of the address range/destination port range is checked to be equal to or less than the maximum size of the hash table, and based on the size of the range relative to the size of the hash table, either the hash of each element (address/destination port number) is generated and used to set a bit, corresponding to the bit index, in a cell corresponding to the hash value (when the size of the range is equal to or less than the maximum size of the hash table), or the bit corresponding to the bit index is set in all of the cells of the hash table (when the size of the range is greater than the maximum size of the hash table).

The hash table building logic 240 builds a hash table for each of the fields/characteristics of interest when selecting fallback sets for rule matching purposes. In the example above, these fields/characteristics comprise the source address, destination address, and destination port. Thus, in one illustrative embodiment, the hash table building logic 240 builds three hash tables—one for source address, one for destination address, and one for destination port. The cells in the hash table entries of each of these hash tables store a bit string in which the individual bits represent a fallback set. If a bit is set, then that indicates that the corresponding fallback set has at least one rule that references the particular field/characteristic as a condition or criteria of the rule, e.g., if the hash table is for source address, and a bit is set in a cell of a hash table entry, then this indicates that the fallback set corresponding to that bit contains a rule referencing a source address corresponding to the hash table entry, i.e. a source address whose hash value corresponds to the hash table entry. While 3 hash tables are used in the examples of the illustrative embodiments, it should be appreciated that more or less numbers of hash tables and corresponding fields/characteristics may be utilized depending on the particular implementation and the desired performance of the filter mechanisms of the illustrative embodiments.

The fallback set selection logic 250 comprises hardware/software logic for selecting or determining which of the fallback sets of rules to use as a basis for traversing search trees of fallback sets to identify matching rules. The fallback set selection logic 250 may implement the functions described previously regarding the matching of data packets to fallback rule sets. That is, in one illustrative embodiment, when a data packet is received, its fields/characteristics are used to generate hash values, e.g., $Y\_sa$, $Y\_da$, and $Y\_dp$, the hash values are used to identify cells within corresponding hash tables, and intersection of the resulting found cells is calculated, and the intersection of these cells is then converted to a listing of fallback set identifiers. This gives a set of fallback sets whose search trees are to be traversed when matching the data packet to rules.

The firewall rule evaluation logic 260 performs the operation of traversing the search trees of the fallback sets identified in the listing of fallback set identifiers and evaluating the rules to determine if the data packet meets the conditions/criteria specified in the rules. If a rule is matched in this way, i.e. the data packet meets the conditions/criteria specified in a rule, then the corresponding action specified in the rule may be initiated. For example, a rule may specify that data packets received from a source address associated with South America should be blocked. In such a case, the source address of the data packet may be compared against the criteria set forth in this rule and if the source address has a value corresponding to a source in South America, e.g., a subnet value indicates South America, then the routing logic 230 of the firewall mechanism 200 may block the routing of this data packet to its destination.

It should be appreciated that the firewall rule evaluation logic 260, in one illustrative embodiment, may implement the matching logic of the G-filter algorithm previously described above. However, this G-filter logic is modified to make use of the fallback set selection logic 250 of the illustrative embodiments to make the matching operation more efficient. That is, with the illustrative embodiments, rather than traversing all of the search trees of all of the fallback sets as would be done in an unmodified G-filter algorithm, the illustrative embodiments provide logic for identifying a subset of the search trees to traverse by identifying the fallback sets having rules that reference particular fields/characteristics of interest.

The rule set storage 270 provides memory, hard disk, or other type of storage hardware and corresponding control hardware/software for storing and accessing the rules and the fallback set identifiers with which the rules are associated. The rule set storage 270 may be used to retrieve rules corresponding to the fallback sets listed in the list of fallback set identifiers determined by the fallback set selection logic 250. These rules may then be applied to the particular fields extracted from the data packet to determine if the data packet satisfies the conditions/criteria of the rule and thus, the corresponding action of the rule is triggered and performed.

The rule set storage 270 may further store the hash tables generated by the hash table building logic 240. Alternatively, these hash tables may be stored in memory associated with the hash table building logic 240 which is accessible by the fallback set selection logic 250.

Thus, the illustrative embodiments provides a mechanism for selecting fallback sets to use when performing rule matching on data packets. The selection is based on hash values and hash tables established for selected fields of data packet header information/characteristics or rules. The hash tables specify which fallback sets have rules referencing specific fields/characteristics and thus, can specifically identify a subset of the fallback sets that should be considered when performing rule matching operations.

Figure 3:
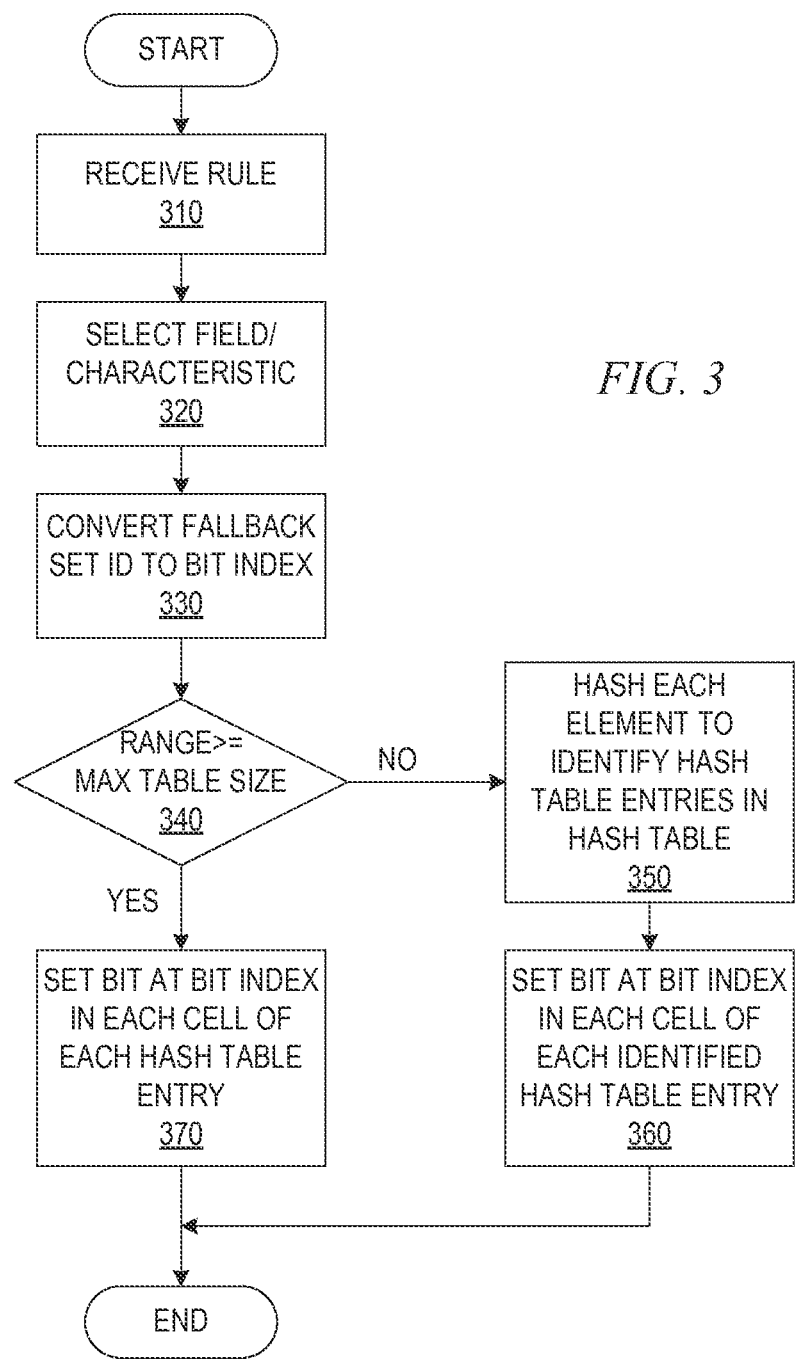
FIG. 3 is a flowchart outlining an example operation for building a hash table in accordance with one illustrative embodiment.

FIG. 3 is a flowchart outlining an example operation for building a hash table in accordance with one illustrative embodiment. The operation outlined in FIG. 3 may be implemented, for example, by the hash table building logic 240 of the firewall mechanisms shown in FIG. 2 above. The operation outlined in FIG. 3 may be implemented for each rule in a rule set, and for each address range (source and destination), destination port range, or other field/characteristic range desired, of the rule. In one illustrative embodiment, the operation in FIG. 3 is performed for each rule in the rule set, and for each of the source address range, each destination address range, and each destination port range of each rule. Thus, the operation of FIG. 3 is performed to generate three separate hash tables, one for source address, one for destination address, and one for destination port.

As shown in FIG. 3, the operation starts by receiving a rule for evaluation (step 310). One of the fields/characteristic ranges specified in the rule is selected for use in building the hash table, e.g., source address range, destination address range, or destination port and a corresponding hash table data structure is selected (step 320). The rules' fallback set identifier associated with the rule is converted to a bit index identifying a bit position within a cell that corresponds to the rule's fallback set (step 330). The range of the fields/characteristics is checked to see if the range size is larger than the maximum size of the hash table (step 340). If not, then each element in the fields/characteristics range is hashed to generate an index to a hash table entry in the hash table (step 350). The bit at the bit index for the fallback set is set in the cells of the hash table entries identified by the hashing of the elements (step 360) and the operation then terminates. If the size of the range of field/characteristic values is greater than the maximum size of the hash table, then the bit at the bit index in each cell of each hash table entry is set (step 370) and the operation terminates.

Figure 4:
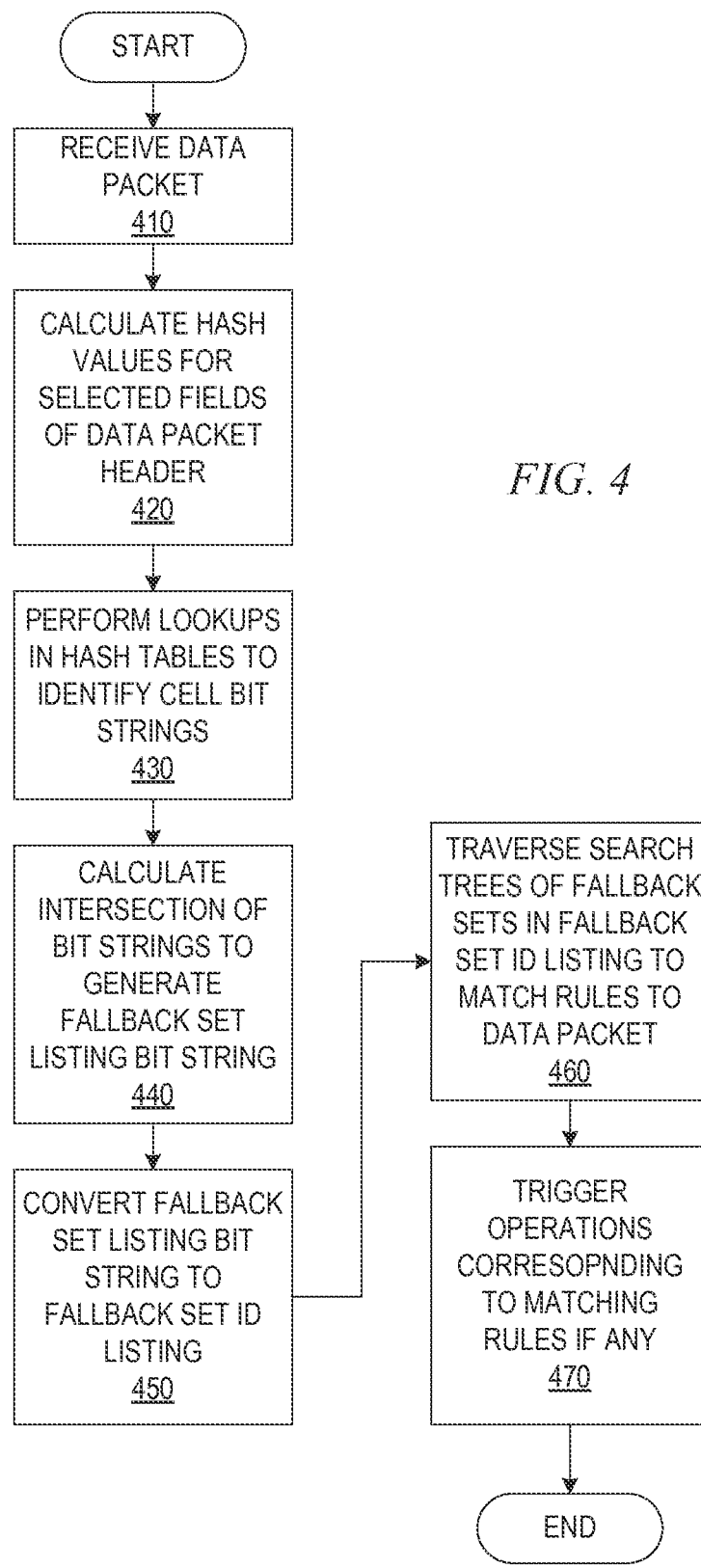
FIG. 4 is a flowchart outlining an example operation for matching data packets to rules in accordance with one illustrative embodiment.

FIG. 4 is a flowchart outlining an example operation for matching data packets to rules in accordance with one illustrative embodiment. The operation shown in FIG. 4 may be implemented, for example by the combined operation of the fallback set selection logic 250 and firewall rule evaluation logic 260 using information stored in the rule set storage 270. The operation outlined in FIG. 4 may be implemented for each data packet received.

As shown in FIG. 4, the operation starts by receiving a data packet (step 410). Hash values for selected fields of the header of the data packet are calculated, e.g., the source address, destination address, and destination port (step 420). These hash values are used to perform lookup operations in corresponding hash tables to identify cells having bit strings corresponding to the specific field values (step 430). The intersection of the bit strings of the cells is calculated to generate a fallback set listing bit string (step 440). The fallback set listing bit string is then converted to a fallback set identifier listing (step 450). The search trees of rules corresponding to each of the fallback sets identified in the fallback set identifier listing are traversed to perform rule matching with regard to the specific field/characteristic values of the header of the received data packet (step 460). Rules whose conditions/criteria are met by the header field/characteristic values have their actions triggered and performed, e.g., blocking the transmission of the data packet, allowing the data packet to be transmitted, generating a notification that is sent to an administrator, logging the data packet, etc. (step 470). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a firewall device, for performing an operation on a received data packet, the method comprising:

receiving a data packet at a network interface of the firewall device, wherein the data packet has a plurality of header field values and wherein each header field value has a different header field value type and each header field value type is associated with a different hash table within a plurality of hash tables;

performing, by the firewall device, a plurality of hash operations on the plurality of header field values to generate a plurality of hash values;

performing, by the firewall device, a plurality of lookup operations in the plurality of hash tables based on the plurality of hash values to identify a plurality of hash table entries;

retrieving, from a rule set storage of the firewall device, a bit string associated with each of the plurality of hash table entries, wherein each bit in the bit string corresponds to a class of rules of a rule set of a firewall and specifies a list of fallback sets of rules thereby generating a plurality of lists of fallback sets of rules;

identifying an intersection of the plurality of lists of fallback sets of rules;

searching, by the firewall device, search trees of fallback sets of rules present in the intersection; and performing, by the firewall device, an operation on the data packet based on one or more rules resulting from searching the search trees of fallback sets of rules present in the intersection.

2. The method of claim 1, wherein performing a matching operation of the header field value to rules in one or more classes of rules corresponding to bits set in the bit string comprises performing a G-filter search of search trees associated with fallback sets of rules in the one or more classes of rules.

3. The method of claim 1, wherein the plurality of header field value types comprises a source address, a destination address, and a destination port number.

4. The method of claim 1, wherein, in response to the header field value type being an address, performing the hash operation on a header field value of a header of the data packet to generate a hash value comprises performing a hash of the two most significant bytes of the header field value to generate the hash value.

5. The method of claim 1, wherein, in response to the header field value type being a destination port number, performing the hash operation on a header field value of a header of the data packet to generate a hash value comprises performing a hash of the middle 8-bits of the header field value.

6. The method of claim 1, wherein bits in the bit string are arranged according to a listing of fallback sets of rules in a full set of rules according to an ordering of fallback set identifiers associated with the fallback sets of rules, wherein a position in the ordering of the fallback set identifiers of a fallback set identifier represents an index into the bit string identifying a corresponding bit in the bit string for a fallback set of rules associated with the fallback set identifier.

7. The method of claim 1, wherein performing an operation based on zero or more rules comprises at least one of blocking transmission of the data packet, allowing transmission of the data packet, sending a notification to an administrator, or logging the data packet in a log data structure.

8. A computer program product comprising a non-transitory computer readable storage medium having a computer readable program stored therein, wherein the computer readable program, when executed on a firewall device, causes the firewall device to:

receive a data packet, wherein the data packet has a plurality of header field values and wherein each header field value has a different header field value type and each header field value type is associated with a different hash table within a plurality of hash tables;

perform a plurality of hash operations on the plurality of header field values to generate a plurality of hash values;

perform a plurality of lookup operations in the plurality of hash tables based on the plurality of hash values to identify a plurality of hash table entries;

retrieve a bit string associated with each of the plurality of hash table entries, wherein each bit in the bit string corresponds to a class of rules of a rule set of a firewall and specifies a list of fallback sets of rules thereby generating a plurality of lists of fallback sets of rules;

identify an intersection of the plurality of lists of fallback sets of rules;

perform a search of search trees of fallback sets of rules present in the intersection; and perform an operation based on one or more rules resulting from searching the search trees of fallback sets of rules present in the intersection.

9. The computer program product of claim 8, wherein the computer readable program further causes the computing device to perform a matching operation of the header field value to rules in one or more classes of rules corresponding to bits set in the bit string at least by performing a G-filter search of search trees associated with fallback sets of rules in the one or more classes of rules.

10. The computer program product of claim 8, wherein the plurality of header field value types comprises a source address, a destination address, and a destination port number.

11. The computer program product of claim 8, wherein, in response to the header field value type being an address, the computer readable program further causes the computing device to perform the hash operation on a header field value of a header of the data packet to generate a hash value at least by performing a hash of the two most significant bytes of the header field value to generate the hash value.

12. The computer program product of claim 8, wherein, in response to the header field value type being a destination port number, the computer readable program further causes the computing device to perform the hash operation on a header field value of a header of the data packet to generate a hash value at least by performing a hash of the middle 8-bits of the header field value.

13. The computer program product of claim 8, wherein bits in the bit string are arranged according to a listing of fallback sets of rules in a full set of rules according to an ordering of fallback set identifiers associated with the fallback sets of rules, wherein a position in the ordering of the fallback set identifiers of a fallback set identifier represents an index into the bit string identifying a corresponding bit in the bit string for a fallback set of rules associated with the fallback set identifier.

14. The computer program product of claim 8, wherein performing an operation based on zero or more rules comprises at least one of blocking transmission of the data packet, allowing transmission of the data packet, sending a notification to an administrator, or logging the data packet in a log data structure.

15. An firewall device, comprising:
a processor; and
a memory coupled to the processor, wherein the memory comprises instructions which, when executed by the processor, cause the processor to:
receive a data packet, wherein the data packet has a plurality of header field values and wherein each header field value has a different header field value type and each header field value type is associated with a different hash table within a plurality of hash tables;
perform a plurality of hash operations on the plurality of header field values to generate a plurality of hash values;
perform a plurality of lookup operations in the plurality of hash tables based on the plurality of hash values to identify a plurality of hash table entries;
retrieve a bit string associated with each of the plurality of hash table entries, wherein each bit in the bit string corresponds to a class of rules of a rule set of a firewall and specifies a list of fallback sets of rules thereby generating a plurality of lists of fallback sets of rules;
identify an intersection of the plurality of lists of fallback sets of rules;
perform a search of search trees of fallback sets of rules present in the intersection; and
perform an operation based on one or more rules resulting from searching the search trees of fallback sets of rules present in the intersection.

16. The firewall device of claim 15, wherein the instructions cause the processor to perform a matching operation of the header field value to rules in one or more classes of rules corresponding to bits set in the bit string at least by performing a G-filter search of search trees associated with fallback sets of rules in the one or more classes of rules.

\* \* \* \* \*